United States Patent
Muhammad et al.

(10) Patent No.: US 12,455,037 B2
(45) Date of Patent: Oct. 28, 2025

(54) SCRAPER RECEIVER WITH FILTER UPSTREAM OF A KICKER VALVE

(71) Applicant: SAUDI ARABIAN OIL COMPANY, Dhahran (SA)

(72) Inventors: Javaid S. Muhammad, Shaybah (SA); Yazeed Alsubhi, Shaybah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 293 days.

(21) Appl. No.: 18/338,925

(22) Filed: Jun. 21, 2023

(65) Prior Publication Data
US 2024/0426415 A1    Dec. 26, 2024

(51) Int. Cl.
F16L 55/46    (2006.01)
B08B 9/04    (2006.01)

(52) U.S. Cl.
CPC .............. *F16L 55/46* (2013.01); *B08B 9/04* (2013.01); *Y10T 137/0435* (2015.04)

(58) Field of Classification Search
CPC ....... F16L 55/46; Y10T 137/0435; B08B 9/04
See application file for complete search history.

(56) References Cited

U.S. PATENT DOCUMENTS

| | | | |
|---|---|---|---|
| 5,884,656 A | 3/1999 | Smith | |
| 9,310,016 B2 | 4/2016 | Hodde | |
| 2013/0125323 A1 | 5/2013 | Henderson | |
| 2013/0256242 A1* | 10/2013 | Koelfgen | B01D 29/232 137/338 |
| 2016/0169436 A1* | 6/2016 | Sander | B08B 9/055 15/104.062 |
| 2017/0246667 A1 | 8/2017 | Hailey et al. | |
| 2021/0262604 A1* | 8/2021 | Hestetun | B08B 9/055 |
| 2023/0250913 A1* | 8/2023 | Tarabzouni | B08B 9/055 277/314 |
| 2024/0125420 A1* | 4/2024 | Hercky | F16L 55/1645 |

FOREIGN PATENT DOCUMENTS

WO    WO-2022175941 A1 *    8/2022    ............... F16L 1/26

* cited by examiner

*Primary Examiner* — Kelsey E Cary
(74) *Attorney, Agent, or Firm* — Vorys, Sater, Seymour and Pease LLP

(57) ABSTRACT

A scraper receiver system includes a mainstream line of a pipeline for transporting a working fluid therethrough. A bypass line includes an inlet and an outlet fluidly coupled to mainstream line and a scraper (PIG) receiver is coupled within the bypass line to receive a scraper therein. At least one kicker valve is coupled within the bypass line downstream of the scraper receiver and a filter apparatus is coupled within the bypass line upstream of the kicker valve. The filter apparatus is operable to remove sludge and solid particles from the working fluid to prevent the sludge and solid particles from being carried to the at least one kicker valve.

20 Claims, 4 Drawing Sheets

SCRAPER RECEIVER WITH FILTER UPSTREAM OF A KICKER VALVE

FIELD OF THE DISCLOSURE

The present disclosure relates to a system for receiving a pipeline scraper (often referred to as a pipeline "pig"), and more specifically, to a system for protecting kicker valves and bypass piping while removing the scraper from a pipeline.

BACKGROUND OF THE DISCLOSURE

Pipelines scrapers are employed for various operations including inspection and maintenance of a pipeline. For example, a pipeline scraper may be deployed periodically to minimize corrosion by removing water/sludge that accumulates at low points in the pipeline. Additionally, pipeline scrapers may be deployed to remove blockages in the pipeline, and thereby reduce pressure drops in the pipeline.

Generally, a pipeline scraper may be placed within the interior of a pipeline such that the scraper is propelled through the pipeline by a fluid flowing therethrough. The scraper is inserted into the pipeline via a launcher, which is then sealed such that the pressure of the fluid forces the scraper along the length of the pipeline. As the scraper travels along the pipeline it may come into contact with sludge, solid and/or liquid debris collected within the pipeline. The sludge and debris are pushed along the pipeline until reaching a scraper receiver vessel where the scraper is removed and the interior of the scraper receiver vessel is cleaned.

A bypass line typically extends through the scraper receiver vessel to permit the fluid in the pipeline to continue to flow through the scraper receiver vessel so that the scraper travels to the scraper receiver vessel with the flow stream. The bypass line may include valves, pipes and other components that may be damaged by the sludge and other debris collected by the scraper. As a result, extensive maintenance may be required including sealant injection into the valves and/or frequent replacement of the valves. For example, the valves in some bypass lines have required replacement three times in seven years. This extensive maintenance is expensive and may require downtime of the systems to which the bypass lines are attached.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a scraper receiver system includes a mainstream line of a pipeline for transporting a working fluid therethrough and a bypass line including an inlet and an outlet fluidly coupled to mainstream line. A scraper receiver vessel is coupled within the bypass line, the scraper receiver vessel including a receiver housing arranged to receive a scraper therein and a hatch removably coupled to the receiver vessel housing. At least one kicker valve is coupled within the bypass line downstream of the scraper receiver vessel, the at least one kicker valve being operable to throttle a flow of the working fluid through the bypass line to zero. A filter apparatus is coupled within the bypass line upstream of the kicker valve. The filter apparatus is operable to remove sludge and solid particles from the working fluid passing therethrough to prevent the sludge and solid particles from being carried to the at least one kicker valve.

According to another embodiment consistent with the present disclosure, a method for receiving a scraper from a mainstream line of a pipeline includes (a) flowing a working fluid through the mainstream line to propel the scraper through the mainstream line, (b) detecting the scraper approaching a scraper receiver vessel of a bypass line having an inlet and an outlet coupled to the mainstream line, (c) opening at least one kicker valve in the bypass line to permit the working fluid to flow through the bypass line and propel the scraper into the bypass line, (d) receiving the scraper in the scraper receiver vessel coupled within the bypass line, and flowing the working fluid through a filter apparatus in the bypass line upstream of the at least one kicker valve to remove sludge and solid particles from the working fluid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
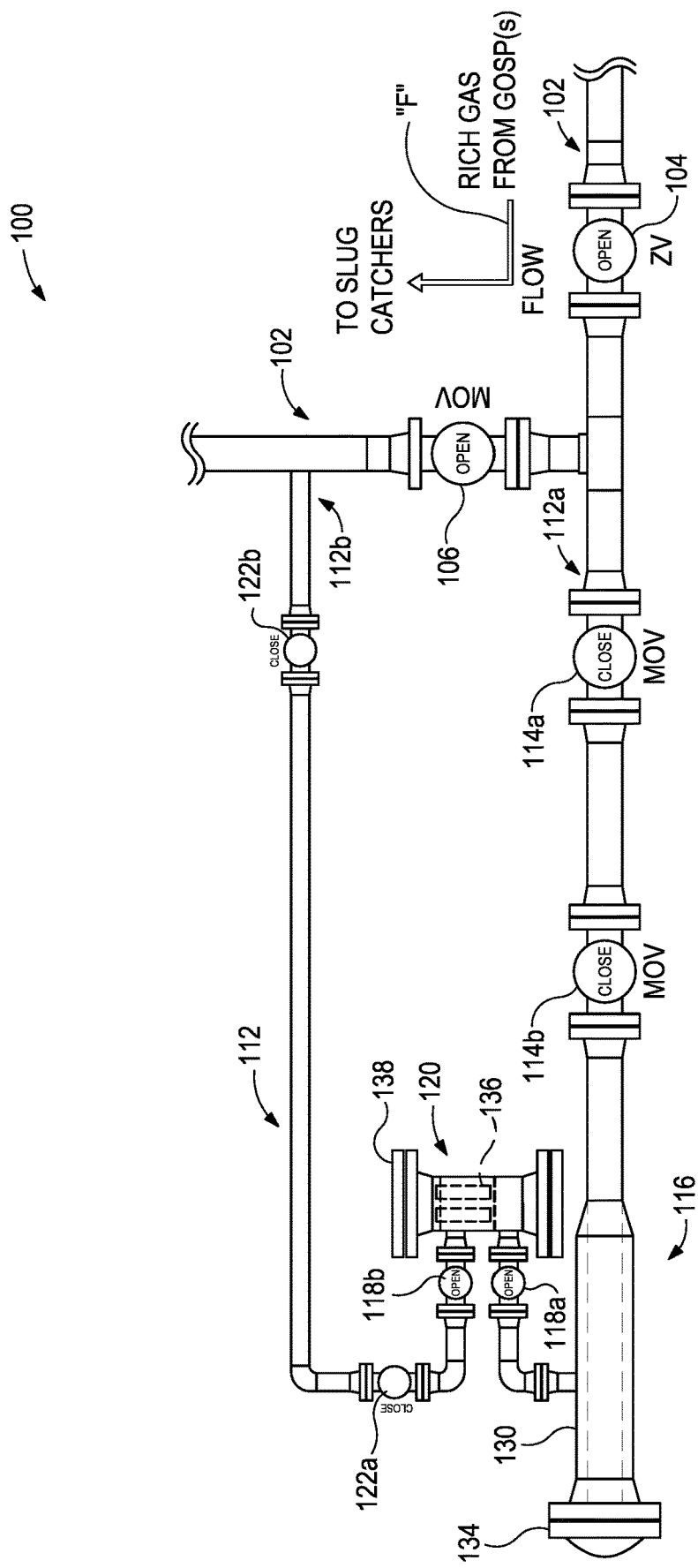
FIG. 1 is a schematic view of a scraper receiving system in a first configuration for flowing a working fluid through a mainstream line in accordance with one or more aspects of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a scraper receiver system including a filter apparatus disposed therein. The filter apparatus is disposed upstream of a kicker valve in a bypass line such that the kicker valve is protected from sludge and solid particles that may be entrained in a working fluid flowing through the bypass line. Blocking valves may be provided upstream and downstream of the filter apparatus to facilitate replacement of filter cartridges once the bypass line is depressurized after scraper receiving activities are completed.

FIG. 1 is a schematic diagram of an example scraper receiving system 100 that may embody or otherwise employ one or more principles of the present disclosure. In the illustrated embodiment, the scraper receiving system 100 is arranged in a first configuration for flowing a working fluid "F" through a mainstream line 102. The working fluid "F" may include, for example, rich gas received from one or more gas-oil separation plant (GOSPs), and in transit to slug catchers (not shown) at a processing facility. In other embodiments, the working fluid "F" may include other fluids such as crude or refined petroleum fuels, biofuels, natural gas liquids (NGLs), water, steam, etc.

The mainstream line 102 includes a safety valve 104 and a main line valve 106 coupled (arranged) therein. The safety valve 104 may remain open throughout the various operations described herein, but may be available to isolate portions of the mainstream line 102 for maintenance or repair. The safety valve 104 may include various types of valves including ball valves, plug valves, gate valves, butterfly valves, which are mostly remotely operable. The main line valve 106 may also include various types of valves for selectively permitting and blocking the flow of working fluid "F" through the mainstream line 102. In the example embodiment illustrated in FIG. 1, the main line valve 106 is designated as a motor-operated valve (MOV), and may be automatically operable in response to an appropriate signal as described in greater detail below. In other embodiments, the main line valve 106 may be manually operable. In the first configuration, the safety valve 104 and the main line valve 106 are both opened such that the working fluid "F" may flow freely through the mainstream line 102.

The scraper receiving system 100 also includes a bypass line 112 including an inlet 112a and an outlet 112b coupled to the main line 102 such that the mainline valve 106 is disposed between the inlet 112a and the outlet 112b. The bypass line 112 generally includes a pair of isolation valves 114a, 114b (referred to herein generally or collectively as "isolation valves 114"), a scraper receiver vessel 116, a pair of block valves 118a, 118b (referred to herein generally or collectively as "block valves 118"), a filter apparatus 120 and a pair of kicker valves 122a, 122b (referred to herein generally or collectively as "kicker valves 122"). In the first configuration shown in FIG. 1, the isolation valves 114 and the kicker valves 122 are closed to prohibit flow of the working fluid "F" through the bypass line 112.

The isolation valves 114 are designated as MOVs and may be automatically operable in response to receiving an appropriate signal, as described in greater detail below. The isolation valves 114 are arranged in series and may be opened and closed together (simultaneously) to provide redundancy. In other embodiments, the isolation valves 114a, 114b are operable independently of one another to permit and obstruct flow through the bypass line 112. In some embodiments, a bleed valve (not shown) may be positioned between the isolation valves 114 to permit pressure to be bled off between the isolation valves 114 and thereby provide "block and bleed functionality" to ensure a tight shut-off, as will be appreciated by those skilled in the art.

The scraper receiver vessel 116 is disposed downstream of the isolation valves 114. The scraper receiver vessel 116 includes a receiver housing 130, which is arranged to receive a scraper 200 (FIG. 2) therein from the mainstream line 102. The scraper receiver vessel 116 also includes a hatch 134 sealed and releasably coupled to the receiver housing 130. In some embodiments, the hatch 134 may be hinged to the receiver housing 130, and in other embodiments, the hatch 134 may be removable from the receiver housing 130 to facilitate extraction of the scraper 200 from the receiver housing 130.

Downstream of the scraper receiver vessel 116, the filter apparatus 120 is fluidly coupled between the block valves 118a, 118b in accordance with aspects of the present disclosure. The block valves 118 are normally open to permit fluid flow through the filter apparatus 120 any time fluid is flowing through the bypass line 112. The filter apparatus 120 includes one or more filter cartridges 136 arranged therein for removing sludge and solid particles from the fluid passing therethrough. The filter apparatus 120 includes a hatch 138, which may be opened to remove or replace the filter cartridges 136. In one or more example embodiments, the filter cartridges 136 may include pipeline filters commercially available from PALL Corporation of Port Washington, NY.

The kicker valves 122 are disposed within the bypass line 112 downstream of the filter apparatus 120. The kicker valves 122 are operable to throttle the flow in the bypass line 112 from a full pipeline pressure to zero. The kicker valves 122 in the scraper receiver system 100 may be constructed as specialized plug valves, which provide a tight seal to discourage leaks therethrough and prevent the backflow pressure when the scraper receiver vessel 116 is isolated. These specialized plug valves may include cylindrical or conically tapered plugs that rotate within a valve body to control flow through the valve. The plugs may have shaped edges that clean valve seats within the valve body as the plug rotates. Any accumulated sludge and solids are removed such that the kicker valves 122 provide a tight shutoff. Plug valves are often associated with high cost and high failure rates, and may be heavy and require significant torque to open or close. Since the filter apparatus 120 removes sludge and solid particles from the fluids that may damage sealing surfaces, the kicker valves 122 may not require specialized plugs and could alternatively be constructed as tight shutoff ball valves, in some embodiments. These tight shutoff ball valves may be more readily available in the market and simpler to maintain than specialized plug valves.

Figure 2:
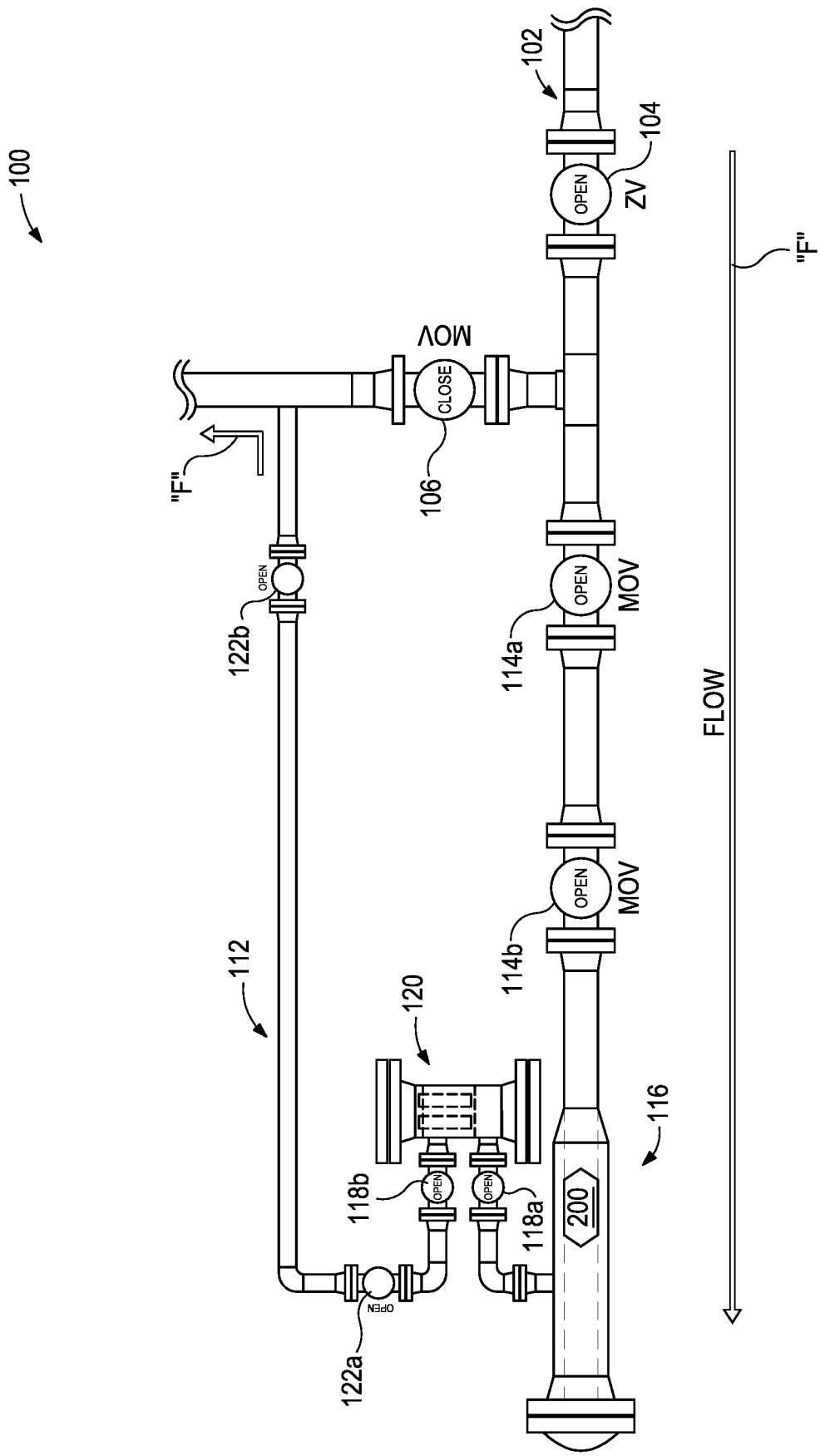
FIG. 2 is a schematic view of the scraper receiving system of FIG. 1 in a second configuration for receiving a scraper from the mainstream line into a scraper receiver vessel of a bypass line coupled to the mainstream line.

Referring now to FIG. 2, the scraper receiver system 100 is illustrated in a second configuration for receiving a scraper 200 into the receiver housing 130 of the scraper receiver vessel 116. In operation, the scraper 200 is carried by the working fluid "F" through the mainstream line 102 toward the safety valve 104. The position of the scraper 200 within the mainstream line 102 may be monitored using techniques known in the art. For example, a transmitter (not shown) with a dedicated frequency may be placed within the scraper 200 and receivers (not shown) may be spaced at various positions along the mainstream line 102. In some example embodiments, when the scraper 200 approaches the safety valve 104, the kicker valves 122 will be fully opened. The isolation valves 114 will be fully opened and the mainline valve 106 will be fully closed to allow the working fluid "F" to flow through the bypass line 112. In some embodiments, the MOVs including the isolation valves 114 and the mainline valve 106, may be operated in response to receiving a signal indicative of the scraper 200 approaching the scraper receiver vessel 116. For example, the MOVs may be instructed to automatically operate when the scraper 200 is detected at a predetermined distance from the scraper receiver vessel 116, isolation valves 114 or another portion of the bypass line 112.

Once the isolation valves 114 are opened and the mainline valve 106 is closed, the working fluid "F" flows from the mainstream line 102, through the isolation valves 114, the scraper receiver vessel 116, the first block valve 118a, the filter apparatus 120, the second block valve 118b, and the kicker valves 122 before re-entering the mainstream line 102. The flow of working fluid "F" carries the scraper 200 through the isolation valves 114 and into the scraper receiver vessel 116, which retains the scraper 200 therein. As the working fluid "F" flows through the bypass line 112, the filter apparatus 120 prevents the sludges and solids particles from traveling to the kicker valves 122, which would otherwise promote erosion, corrosion and metal loss of the valve seats and conduits downstream of the filter apparatus 120.

Figure 3:
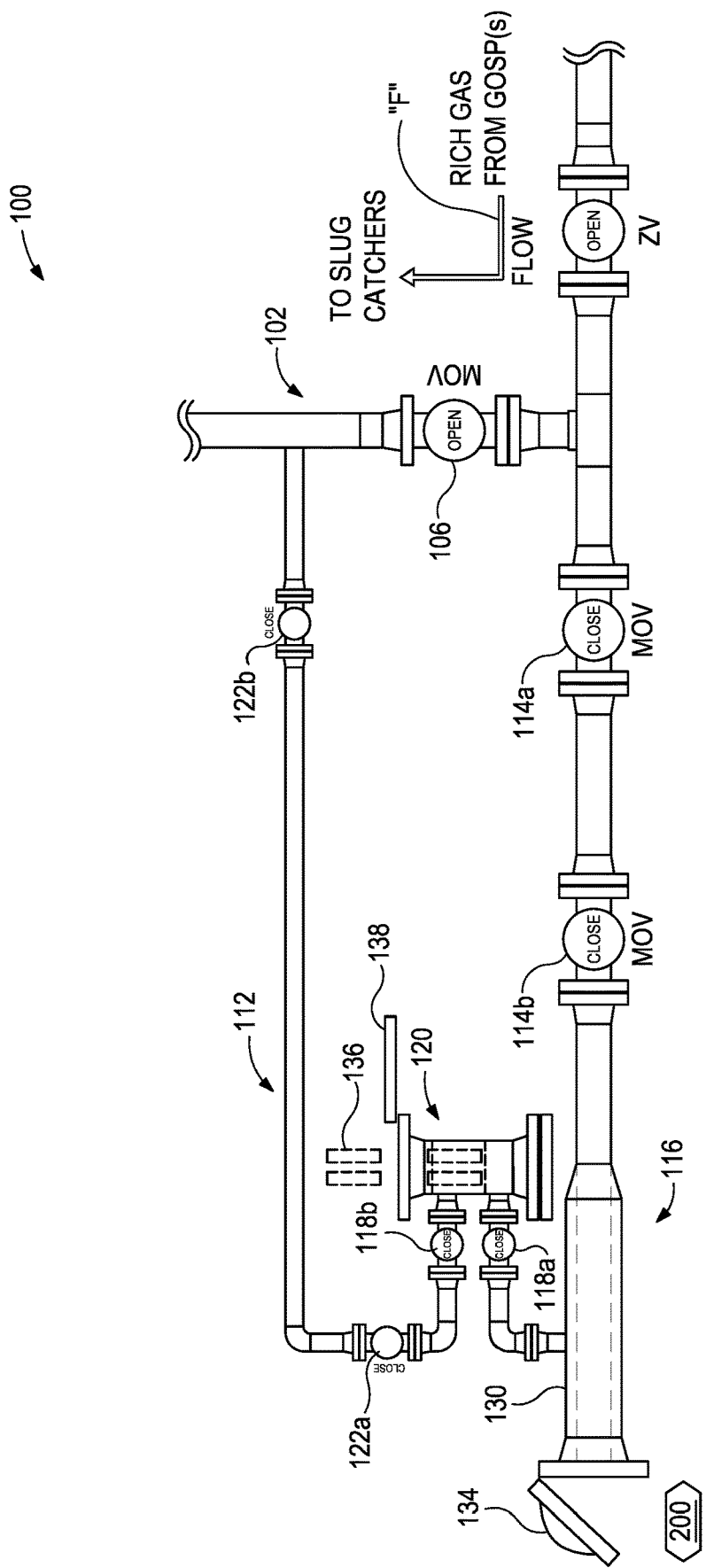
FIG. 3 is a schematic view of the scraper receiving system of FIG. 1 in a third configuration for removing the scraper and cleaning the scraper receiver vessel and also replacing filter cartridges from a filter apparatus disposed upstream of a kicker valve in the bypass line in accordance with one or more aspects of the present disclosure.

Referring now to FIG. 3, the scraper receiver system 100 is illustrated in a third configuration for removing the scraper 200, cleaning the scraper receiver vessel 116 and replacing the filter cartridges 136 from the filter apparatus 120. In one or more embodiments, once the scraper 200 is received within the scraper receiver vessel 116, the main line valve 106 will be opened and the isolation valves 114 and the kicker valves 122 will be closed. The working fluid "F" will then flow through the mainstream line 102, and the bypass line 112 will be depressurized through a vent (not shown), through the scraper receiver vessel 116 or another opening in the bypass line 112. The hatch 134 will be opened and otherwise separated from the receiver housing 130 to extract the scraper 200 from the scraper receiver vessel 116.

The block valves 118 may be closed to isolate the filter apparatus 120 from the remainder of the bypass line 112. The filter apparatus 120 may thus be isolated and blinded to ensure safety during maintenance activities such as replacement of the filter cartridges 136. The hatch 138 is then opened to remove or replace the filter cartridges 136. Any accumulated sludge or solid particles may be cleaned from the filter apparatus 120, and new or refurbished filter cartridges 136 may be installed. The hatches 134 and 138 will then be closed, and the block valves 118 may be reopened to prepare the bypass line 112 for further scraper receiving operations.

Figure 4:
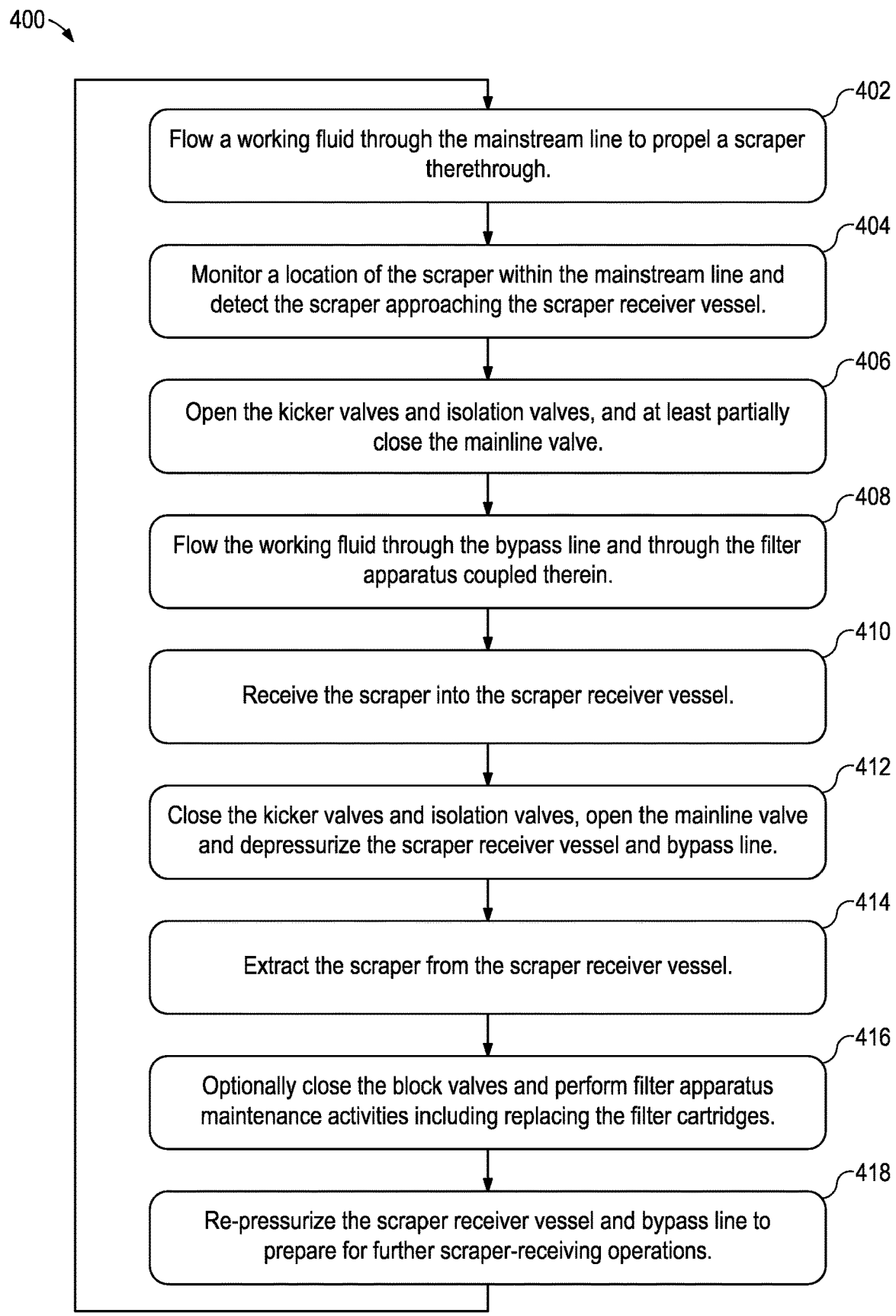
FIG. 4 is a flowchart illustrating a procedure for operating the scraper receiving system of FIG. 1 to receive the scraper and replace the filter in accordance with one or more aspects of the present disclosure.

Referring now to FIG. 4, and with continued reference to FIGS. 1-3, a procedure 400 is described for operating the scraper receiver system 100. Initially at step 402, a working fluid is flowed through the mainstream line to propel a scraper through the mainstream line. A location of the scraper is monitored as it passes through the mainstream line, as at step 404. Upon detecting the scraper approaching the scraper receiver vessel of the bypass line, the bypass line may be prepared for receiving the scraper.

At step 406, the kicker valves and isolation valves may be opened and the main line valve may be fully closed. In some other embodiments, the main line valve will be at least partially closed such that sufficient working fluid flows through the bypass line to carry the scraper to the scraper receiver vessel. All or a portion of the working fluid will then flow through the bypass line, as at step 408, and the working fluid flowing through the bypass line will be filtered by the filter apparatus coupled therein. Sludge and solid particles are to be removed from the working fluid upstream of the kicker valves, to thereby protect the kicker valves.

Next, at step 410, the scraper may be received within the scraper receiver vessel. Once the scraper is detected within the scraper receiver vessel, the kicker valves and the isolation valves may be closed to isolate the bypass line, and the mainline valve may be opened to facilitate flow through mainstream line, as at step 412. The bypass line may be depressurized by venting any remaining working fluid from the bypass line.

At step 414, the hatch of the scraper receiver vessel may be opened and the scraper may be extracted from the scraper receiver vessel. Any sludge and solid particles that may have accumulated within the scraper receiver vessel may also be cleaned from the scraper receiver vessel.

Optionally, at step 416, filter apparatus maintenance activities such as changing the filter cartridges may be performed if necessary. The block valves may be closed to isolate the filter apparatus from the remainder of the bypass line and the hatch of the filter apparatus may be removed. The used filter cartridges may be removed and replaced with new or clean filter cartridges.

The procedure 400 may then proceed to step 418, where the bypass line is prepared for further scraper receiving operations. The hatches of the scraper receiver vessel and the filter apparatus may be closed, and the block valves may be opened to fluidly couple the filter apparatus to the remainder of the bypass line. Thus, the working fluid may be reintroduced to re-pressurize the scraper receiver vessel and the bypass line for further scraper-receiver operations. As the working fluid flows through the bypass line during the next scraper receiving operation, sludge and solid particles will be removed by the filter apparatus before reaching the kicker valves. The procedure 400 may then return to step 402 where additional scraper operations may be conducted.

It should be appreciated that the steps of procedure 400 may be conducted in alternate orders. Also, not every step may be performed in every procedure for operating the scraper receiver system 100.

The terminology used herein is for the purpose of describing particular embodiments only and is not intended to be limiting of the invention. As used herein, for example, the singular forms "a." "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A scraper receiver system, comprising:
    a mainstream line of a pipeline for transporting a working fluid therethrough;
    a bypass line including an inlet and an outlet fluidly coupled to mainstream line;
    a scraper receiver vessel coupled within the bypass line, the scraper receiver vessel including a receiver housing arranged to receive a scraper therein and a hatch removably coupled to the receiver vessel housing;
    at least one kicker valve coupled within the bypass line downstream of the scraper receiver vessel, the at least one kicker valve operable to throttle a flow of the working fluid through the bypass line to zero;
    a filter apparatus coupled within the bypass line upstream of the kicker valve, the filter apparatus operable to remove sludge and solid particles from the working fluid passing therethrough to prevent the sludge and solid particles from being carried to the at least one kicker valve; and
    a pair of block valves fluidly coupled to the filter apparatus, a first block valve being coupled upstream of the filter apparatus and a second block valve being coupled downstream of the filter apparatus.

2. The scraper receiver system of claim 1, further comprising:
    a mainline valve coupled within the mainstream line of the pipeline between the inlet and outlet of the bypass line; and
    at least one isolation valve coupled within the bypass line between the inlet and the scraper receiver vessel, wherein the at least one isolation valve is operable to selectively permit and prohibit flow of the working fluid through the bypass line and also to prevent backflow during normal operations.

3. The scraper receiver system of claim 2, wherein the mainline valve and the at least one isolation valve are motor operated valves operable in response to a signal indicative of the scraper approaching the scraper receiver vessel.

4. The scraper receiver system of claim 2, wherein the filter apparatus is disposed between the at least one isolation valve and the at least one kicker valve.

5. The scraper receiver system of claim 1, wherein the at least one kicker valve comprises a pair of kicker valves coupled in series.

6. The scraper receiver system of claim 1, wherein the filter apparatus includes a removable hatch and at least one filter cartridge removable through the hatch.

7. The scraper receiver system of claim 1, wherein the bypass line includes conduits having a first diameter upstream of the scraper receiver vessel and conduits having a second diameter downstream of the scraper receiver vessel, and wherein the second diameter is smaller than the first diameter.

8. A method for receiving a scraper from a mainstream line of a pipeline, the method comprising:
    flowing a working fluid through the mainstream line to propel the scraper through the mainstream line;
    detecting the scraper approaching a scraper receiver vessel of a bypass line having an inlet and an outlet fluidly coupled to the mainstream line;
    opening at least one kicker valve in the bypass line to permit the working fluid to flow through the bypass line and propel the scraper into the bypass line;
    receiving the scraper in the scraper receiver vessel coupled within the bypass line; and
    flowing the working fluid through a filter apparatus in the bypass line upstream of the at least one kicker valve to remove sludge and solid particles from the working fluid.

9. The method of claim 8, further comprising:
    at least partially closing a mainline valve coupled within the mainstream line of the pipeline between the inlet and outlet of the bypass line; and
    opening at least one isolation valve coupled within the bypass line between the inlet and the scraper receiver vessel, wherein the at least one isolation valve is operable to selectively permit and prohibit flow of the working fluid through the bypass line.

10. The method of claim 9, further comprising operating the mainline valve and the at least one isolation valve with a motor in response to a signal indicative of the scraper approaching the bypass line.

11. The method of claim 9, wherein opening the at least one isolation includes opening a pair of isolation valves coupled in series within the bypass line.

12. The method of claim 8, further comprising closing a pair of block valves coupled to the filter apparatus, a first block valve of the pair of block valve coupled upstream of the filter apparatus and a second block valve of the pair of block valves coupled downstream of the filter apparatus.

13. The method of claim 12, further comprising opening a hatch of the filter apparatus and replacing at least one filter cartridge through the hatch.

14. The method of claim 8, wherein opening the at least one kicker valve includes opening a pair of kicker valves coupled in series within the bypass line.

15. A scraper receiver system, comprising:
    a mainstream line of a pipeline for transporting a working fluid therethrough;
    a bypass line including an inlet and an outlet fluidly coupled to mainstream line;
    a scraper receiver vessel coupled within the bypass line, the scraper receiver vessel including a receiver housing arranged to receive a scraper therein and a hatch removably coupled to the receiver vessel housing;
    at least one kicker valve coupled within the bypass line downstream of the scraper receiver vessel, the at least one kicker valve operable to throttle a flow of the working fluid through the bypass line to zero;
    a filter apparatus coupled within the bypass line upstream of the kicker valve, the filter apparatus operable to remove sludge and solid particles from the working fluid passing therethrough to prevent the sludge and solid particles from being carried to the at least one kicker valve;

a mainline valve coupled within the mainstream line of the pipeline between the inlet and outlet of the bypass line;

at least one isolation valve coupled within the bypass line between the inlet and the scraper receiver vessel, wherein the at least one isolation valve is operable to selectively permit and prohibit flow of the working fluid through the bypass line, wherein the mainline valve and the at least one isolation valve are automatically operable in response to a signal indicative of the scraper approaching the scraper receiver vessel.

16. The scraper receiver system of claim 15, wherein the at least one kicker valve comprises a pair of kicker valves coupled in series.

17. The scraper receiver system of claim 15, wherein the signal indicative of the scraper approaching the scraper receiver vessel is indicative of the scraper being detected at a predetermined distance from the the scraper receiver vessel.

18. The scraper receiver system of claim 15, wherein the filter apparatus is disposed between the at least one isolation valve and the at least one kicker valve.

19. The scraper receiver system of claim 15, wherein the filter apparatus includes a removable hatch and at least one filter cartridge removable through the hatch.

20. The scraper receiver system of claim 15, wherein the bypass line includes conduits having a first diameter upstream of the scraper receiver vessel and conduits having a second diameter downstream of the scraper receiver vessel, and wherein the second diameter is smaller than the first diameter.

* * * * *